Aug. 20, 1968     V. HÄRTEL     3,397,571
METHOD FOR THE CONTINUOUS MEASUREMENT OF PLASTICITY
OF RUBBER MIXTURES IN A MIXING MILL
Filed Oct. 7, 1965
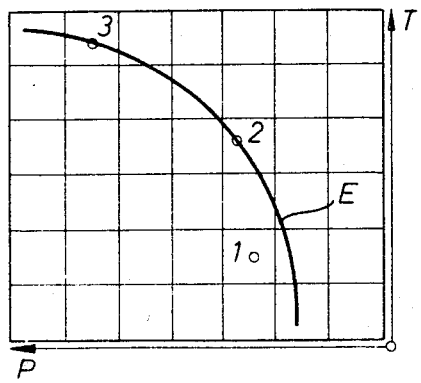

United States Patent Office 3,397,571
Patented Aug. 20, 1968

3,397,571
METHOD FOR THE CONTINUOUS MEASUREMENT OF PLASTICITY OF RUBBER MIXTURES IN A MIXING MILL
Volker Härtel, Isegrimstrasse 27,
Lubeck-Eichholz, Germany
Filed Oct. 7, 1965, Ser. No. 493,751
Claims priority, application Germany, Oct. 8, 1964,
G 41,734
2 Claims. (Cl. 73—54)

ABSTRACT OF THE DISCLOSURE

A process for measuring the plasticity of a rubber blend in a mixing mill in which values of plasticity and temperature of the blend are concurrently measured and projected as separate intersecting lines onto a two-dimensional coordinate system which contains a calibration curve of thermoplasticity which relates plasticity and temperature for the considered rubber blend, thereby enabling treatment in said mill for coordinating the plasticity and temperature values of the blend such that the intersecting point of the intersecting lines is moved to a discrete point on the calibration curve.

---

Operators in the rubber industry are faced with the difficult problem of producing, in mixing mills, mixtures of rubber, fillers, and so on in a predetermined degree of plasticity suited to the type of later treatment to which the mixture will be subjected, because the production of the mixtures depends a great deal on accurate control by the attendant of the mixing plant and his reliability, and the production of the mixture can only be regulated and supervised with difficulty. It can easily happen that the degree of plasticity of two mixtures can be different although both of them contain the same components, and the period of treatment has been the same in both cases. The differences for the two mixes could be reconciled by a further treatment without interrupting the milling operation, if it were possible to determine the deviations from a norm before the production process had been completely terminated and the mixture was still in the mill.

To determine the plasticity of a rubber mixture the normal procedure hitherto has been to make the required measurements subsequently in the laboratory. Thus, when deviations are determined, the mixture concerned must be returned to the mixing mill for further treatment. This is a very troublesome procedure which consumes time and makes the manufacture uneconomical.

Methods are known in which the measurement of the degree of plasticity is performed through the agency of pressure dispensers at the mixing mill. Since the plasticity of a rubber mixture can be measured in relation to temperature, a function of the formula $$P = f(T)$$

can be evaluated from plasticity measurements made at different temperatures, P representing the plasticity and T the temperature. In the majority of cases these functions are of an exponential nature. Even these troublesome calculations, however, do not allow for continuous supervision of the degree of plasticity of the mixture during the treatment in the rotating mixing mill, because no way has yet been found of excluding the temperature factor during the measurement of plasticity in such a way as to allow for determination, by means of apparatus, of the "thermoplasticity" during continuous production.

One was therefore faced with the considerable disadvantage that working and mixing times had to be established by average sampling of the starting plasticity and this produced non-uniform plasticity values for the mixtures and consequently considerable operating uncertainty.

In order to overcome the disadvantages noted above, the present invention proposes a method by which measurements of plasticity of rubber mixtures can be carried out at the site of the running mixing mill, such that the required degree of working is given with certainty for a rubber mixture as it actually comes from the mixing mill.

To this end, in accordance with the present invention a coupling of the measurements of plasticity and temperature is performed at the surface or skin of the rubber mixture rotating in the mixing mill, and the coupled measurements are compared with a calibrated thermoplasticity curve for this mixture which is predetermined for the rubber mixture concerned.

The way in which the plasticity is measured, be it by the force which is applied to a mandrel of predetermined shape which is introduced into the mouth of the mill, when the mixture flows around this mandrel, or by the depth of penetration of a measuring mandrel or by a measuring wheel of suitable form which is mounted at the periphery of the mill under a predetermined load and penetrates into the surface or skin of the mix to a greater or lesser degree depending on the plasticity prevailing at the time, is not vital to the performance of the method of the invention and is merely a question of technical facility. Moreover the method of measuring the temperature, for example by direct measurement with a thermosensitive element built into the aforesaid mandrel, or by measurement of the heat radiated, and so on, is unimportant in the practice of the method of this invention. The essential point is the coupling of the measurements for plasticity and temperature and its transmittal to a suitable metering means; the measurements do not require to be in the form of absolute values because only the reproductive ability has to be given at the measuring apparatus, preferably on a common two dimensional scale of the latter. For this reason, moreover, no special calibration of the temperature measurement is necessary.

In a specific manner of performing the invention, the plasticity and the temperature of the surface of a rubber mixture rotating in the mixing mill is measured at predetermined times, and these measurements are projected as separate but intersecting lines of measurement, for example in the form of optical crossed hair lines, on a two dimensional system of co-ordinance which includes the aforesaid calibrated curve of the thermoplasticity of the mixture concerned, and the plasticity and temperature values of the moving skin are so related to one another that the point of intersection of the crossed hair lines is located at a required point on the calibrated curve. When this is the case, the mixture has a degree of plasticity which corresponds to the calibrated curve and thus to the prescribed value. Since the calibrated curves corresponding to the rubber mixtures can be readily replaced, the operator at the mixing mill has only to receive a signal that the surface of the rotating mixture in the mill is homogeneous, before beginning to take the measurements of plasticity and temperature, and then continuing the processing of the mixture until the intersection of the cross hairs of the measurements registers with the required part of the calibrated curve. By this means it is possible to produce a required constant plasticity with a minimum outlay of time and expense, even when operating with unknown forces.

The accompanying diagram shows a measuring scale with a calibrated curve for a specific rubber mixture. In this diagram the co-ordinates P represent plasticity and T temperature, and the calibrated curve is designated E. It will be observed that this intersection of the cross hairs, that is to say the measured thermoplasticity of the surface of the rotating mixture, when at point 1, has not yet reached the required degree. In contrast, measurements corresponding to points 2 and 3 give a registration of the intersection of the cross hairs with the calibrated curve, indicating that the rubber mixture then has the required degree of plasticity.

The calibrated curve of thermoplasticity for each rubber mixture of known, predetermined plasticity number is determined at the mixing mill with a suitable measuring apparatus, in the following manner. A mixture of known and required plasticity is taken and different samples are heated to different temperatures, and the temperature and plasticity are measured at the running mill in such a way that the measurements are transmitted by suitable means, for example electric, to a measuring apparatus and here shown visibly in the form of measuring lines (optical or mechanical), which intersect in the form of cross hairs. These cross hairs are located over a system of coordinates indicating temperatures $T \times$ plasticity $P$. The position of the intersection of the cross hairs concerned are transmitted to this system of coordinates as individual points for different temperatures, and thus the corresponding varying plasticities of the rubber mixture from a predetermined starting plasticity, are joined together.

If mixtures are used which are of the same composition but with different initial degrees of plasticity, there will of course be a system of curves. Since the calibration for each mixture is tested directly at the mixing mill and transmitted to the measuring apparatus, it is unnecessary to make any calibration of the temperature measurement on the centigrade scale, or to calculate the functional relationship between the plasticity and the depth of penetration or the force effect on a measuring mandrel.

I claim:
1. A process for measuring the plasticity of a rubber blend in a mixing mill, said process comprising concurrently measuring values of plasticity and temperature of the blend while in the mill, projecting these measured values as separate intersecting lines, onto a two-dimensional coordinate system, which contains a calibration curve of thermoplasticity which relates plasticity and temperature for the considered rubber blend thereby enabling treatment in said mill for coordinating the plasticity and temperature values of the blend such that the intersecting point of the intersecting lines is moved to a discrete point on the calibration curve.

2. A process as claimed in claim 1 wherein said calibration curve of thermoplasticity is obtained by heating specimens of a rubber mix of known and desirable plasticity to various temperatures, measuring the plasticity values concurrently with the aforesaid temperature values, transferring these coordinated values onto a coordinate system in which plasticity is plotted as a function of temperature and drawing the desired calibration curve from the plotted values.

References Cited

UNITED STATES PATENTS 2,519,378   8/1950   Kilpatrick _____ 73—59
3,182,494   5/1965   Beatty et al. _____ 73—59 XR DAVID SCHONBERG, *Primary Examiner.*